May 10, 1960     H. KRAUSE     2,935,895
AUXILIARY BRAKE AND RELEASE
Filed Nov. 13, 1957     5 Sheets-Sheet 1

INVENTOR.
Herbert Krause,
BY Parker & Carter.
Attorneys.

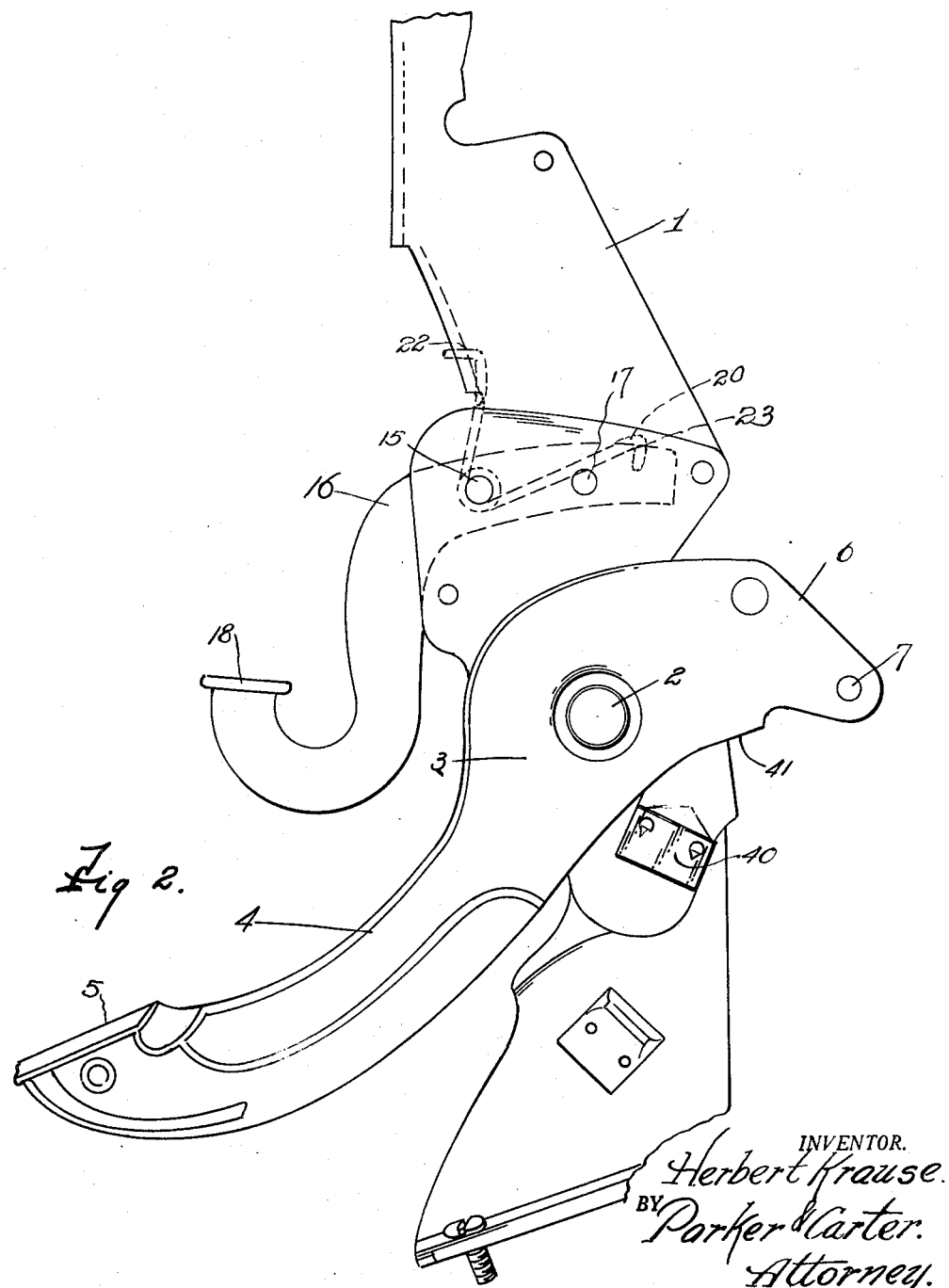

May 10, 1960 H. KRAUSE 2,935,895
AUXILIARY BRAKE AND RELEASE
Filed Nov. 13, 1957 5 Sheets-Sheet 3
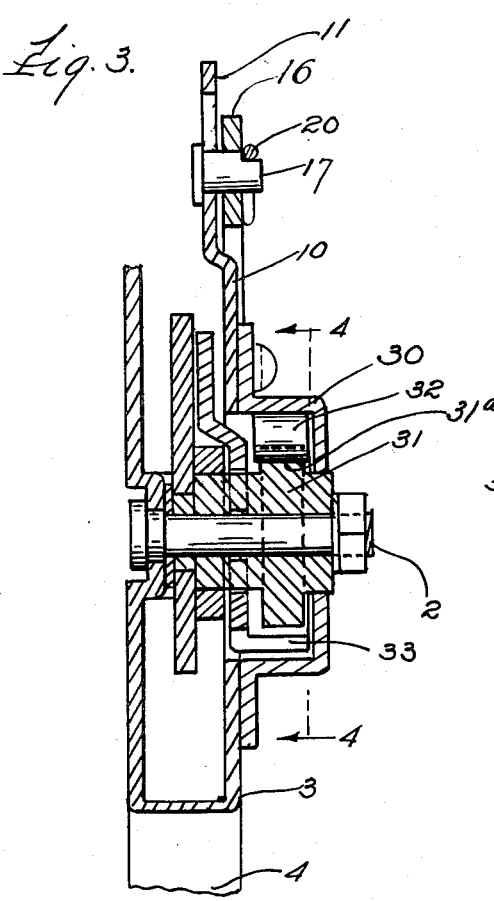
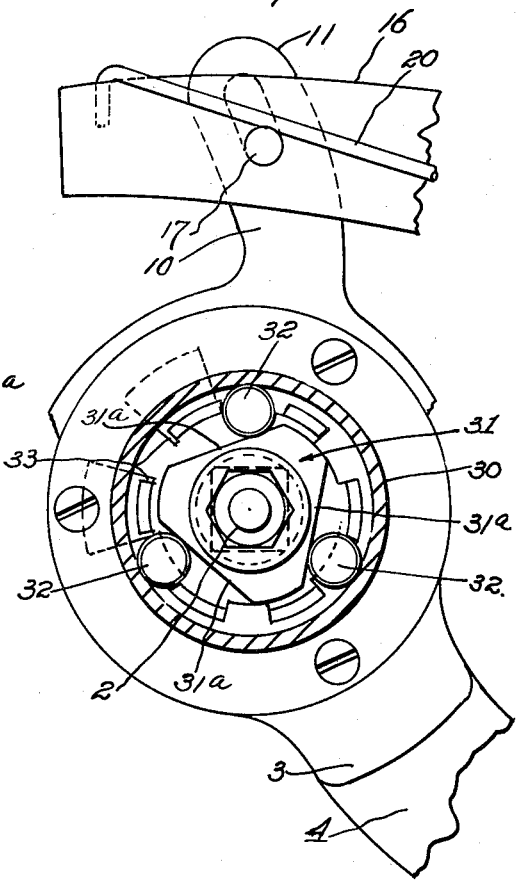
INVENTOR.
Herbert Krause.
BY Parker & Carter.
Attorneys.

May 10, 1960 — H. KRAUSE — 2,935,895
AUXILIARY BRAKE AND RELEASE
Filed Nov. 13, 1957 — 5 Sheets-Sheet 5

Inventor
Herbert Krause by Parker & Carter
Attorneys

United States Patent Office 2,935,895
Patented May 10, 1960

2,935,895
AUXILIARY BRAKE AND RELEASE

Herbert Krause, Chicago, Ill., assignor to Chicago Forging and Manufacturing Company, Chicago, Ill., a corporation of Delaware Application November 13, 1957, Serial No. 696,251

8 Claims. (Cl. 74—531)

This invention relates to control mechanisms and has particular relation to a control mechanism for auxiliary brakes such as those employed in vehicles, for example.

One purpose of the invention is to provide an emergency automobile brake control operable to apply the brakes by foot pressure of the operator and operable to release the brakes by foot pressure of the operator.

Another purpose is to provide an emergency brake control mechanism operable in one direction to apply the brakes and having a release mechanism operable in the same direction to release the brakes.

Another purpose is to provide an auxiliary brake control operable by application of smooth, continuous pressure to apply the brakes.

Another purpose is to provide an auxiliary brake control operable to apply and hold the brakes at any position in the course of its travel in brake-applying direction.

Another purpose is to provide an auxiliairy brake control which may be operated virtually silently.

Another purpose is to provide an auxiliary brake control release mechanism which shall be operable with the slightest amount of pressure in braking-releasing direction.

Another purpose is to provide an auxiliary brake control and release mechanism comprising a first lever rotatably mounted for movement in one direction to apply the brakes and a release lever rotatably mounted for movement in the same direction to release the brakes.

Another purpose is to provide an auxiliary brake control and release mechanism effective to provide smooth, quiet application of emergency brakes and immediate, positive release thereof and which nonetheless shall be of maximum economy and simplicity in manufacture.

Another purpose is to provide a main brake control lever, a locking means, a release member and a release operating lever all operable about a common axis.

Other purposes will appear from time to time during the course of the specification and claims.

I illustrate my invention more or less diagrammatically in the accompanying drawings wherein—

Figure 2 is an opposite side elevation.

Figure 3 is a view taken on the line 3—3 of Figure 1.

Figure 4 is a detail view illustrating the brake-holding mechanism of my invention.

Like parts are indicated by like numerals throughout the specification and drawings.

The present application is a continuation-in-part of my application Serial No. 673,198 filed July 22, 1957 and entitled, "Auxiliary Brake."

Figure 1:
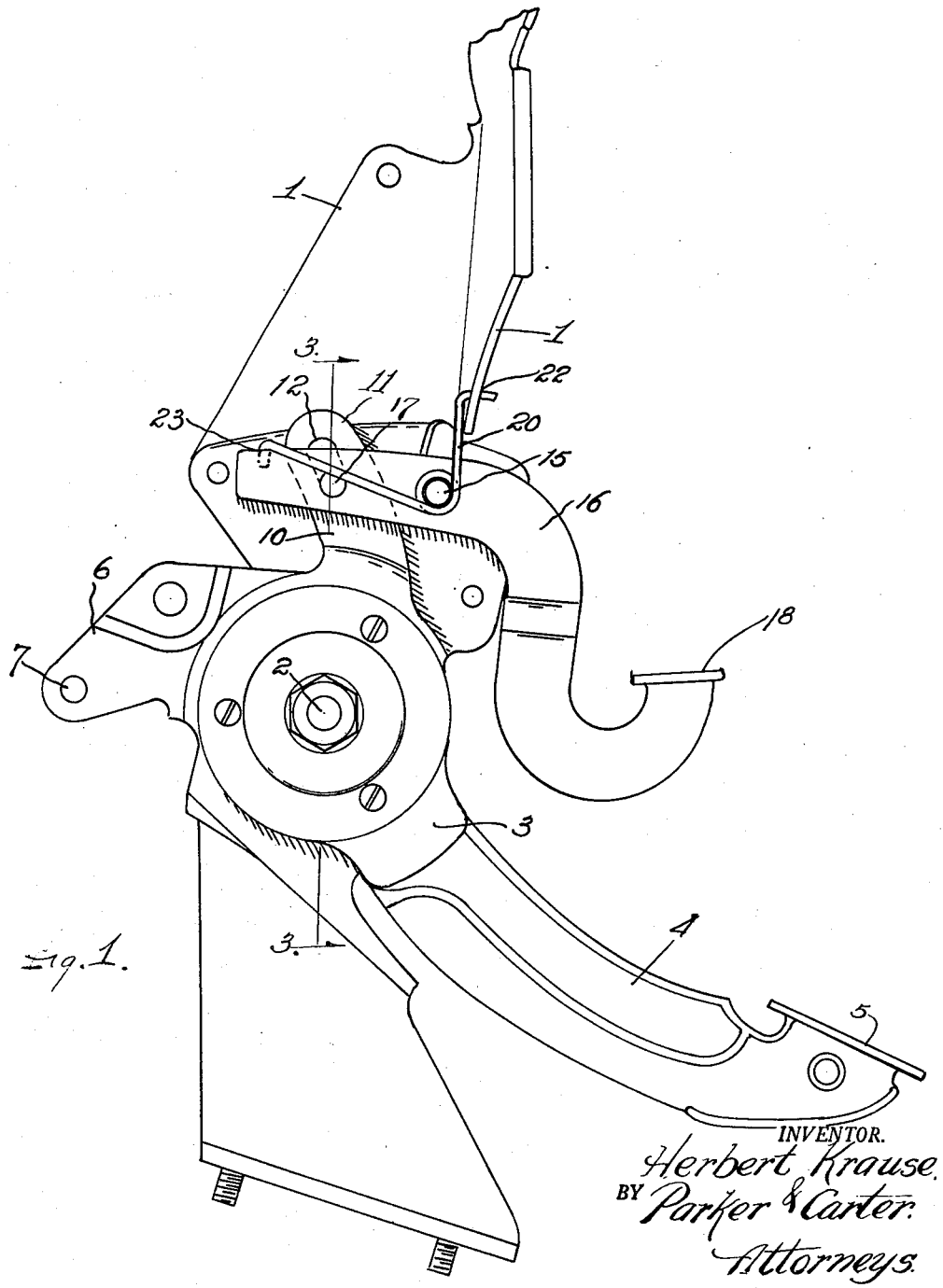
Figure 1 is a side elevation illustrating the control means of my invention in partial brakes-on position.

Referring now to the drawings and particularly to Figure 1, numeral 1 generally indicates a mounting plate or support or bracket which may assume any suitable form effective for mounting appropriately in a vehicle, such as an automobile, with which the control mechanism of my invention may be employed. Rotatably mounted about a pivot 2 on the plate 1 is the brake control arm 3. The control arm 3 has an elongated portion 4 at the outer end of which is positioned a foot-operable pedal portion 5. The opposite end 6 of the lever 3, beyond the pivot from the portion 4, may be apertured as at 7 to operatively receive an emergency brake cable (not shown) in the manner well-known in the art.

A brake-release lever element 10 is mounted for rotation about the point of the pivot 2 and has an arm portion 11 extending outwardly of the area occupied by the lever 3. The portion 11 has formed therein a longitudinal slot 12.

Pivotally mounted on plate 1 at a point spaced from the pivot 2, as indicated at 15, is a foot-operable brake release arm or lever 16. The lever 16 has secured thereto a pin 17 extending laterally from the lever 16 and penetrating the slot 12 in the release arm 11. Beyond the pivot 15 from the pin 17 the release control lever extends substantially in the direction of the arm portion 4 of the control lever 3 and carries at its outer end the foot-operable pedal element 18. As the parts are shown in the drawings, the release lever 16 may be generally S-shaped in planar form. A yielding means, such as the spring 20, may be wound about the pivot 15 and may have its opposite ends in engagement with the mounting plate 1 and an end portion of the lever 16, as indicated at 22, 23 respectively.

Referring now to Figures 3 and 4, the control lever 3 carries integrally therewith a cylindrical housing portion 30. Fixed on the plate 1 and extending into the housing 30 is a rigid cam element 31 which may, as illustrated, have three camming surfaces arranged in triangularly converging planes. Thus the cam faces lie in intersecting planes tangentially disposed to the axis thereof and circumferentially spaced and equidistant radially from the axis of the housing 30. A number of rollers or rounded members 32, equal in number with the cam surfaces 31a of the cam 31, are positioned within the housing 30 for movement along the cam surfaces 31a, the diameter of the elements 32 being slightly less than the wider space between the inner cylindrical wall of the housing 30 and the opposed center point of each of the cam surfaces 31a, the said diameter being greater than the narrower space between the inner cylindrical wall of the housing 30 and each of the opposite edge portions of each of the cam surfaces 31a.

The release element 10 has a plurality of roller-operating or finger portions 33 positioned within the housing 30, and movable about the pivot 2. The fingers 33 are sufficient in number to operate all of the elements 32 and extend between pairs of adjacent members 32.

Referring now to Figure 2, it will be observed that the arm 3 may be constructed of mating halves joined (as by spot welding) to form an integral arm portion 4 but spaced apart in parallel wall portions adapted to straddle mounting plate 1 in the region of pivot 2. An abutment element 40 may be secured to the plate 1 and may, for example, be comprised of material having the properties of rubber, the arm 3 having an abutment surface 41 positioned to engage the member 40 when the control arm 3 is moved to full brake-releasing position.

Although an operative form of the device has been shown, the invention is not limited to the particular details shown. Many changes may be made in the form, shape and arrangement of parts without departing from the spirit of the invention as set forth in the appended claims.

Figure 5:
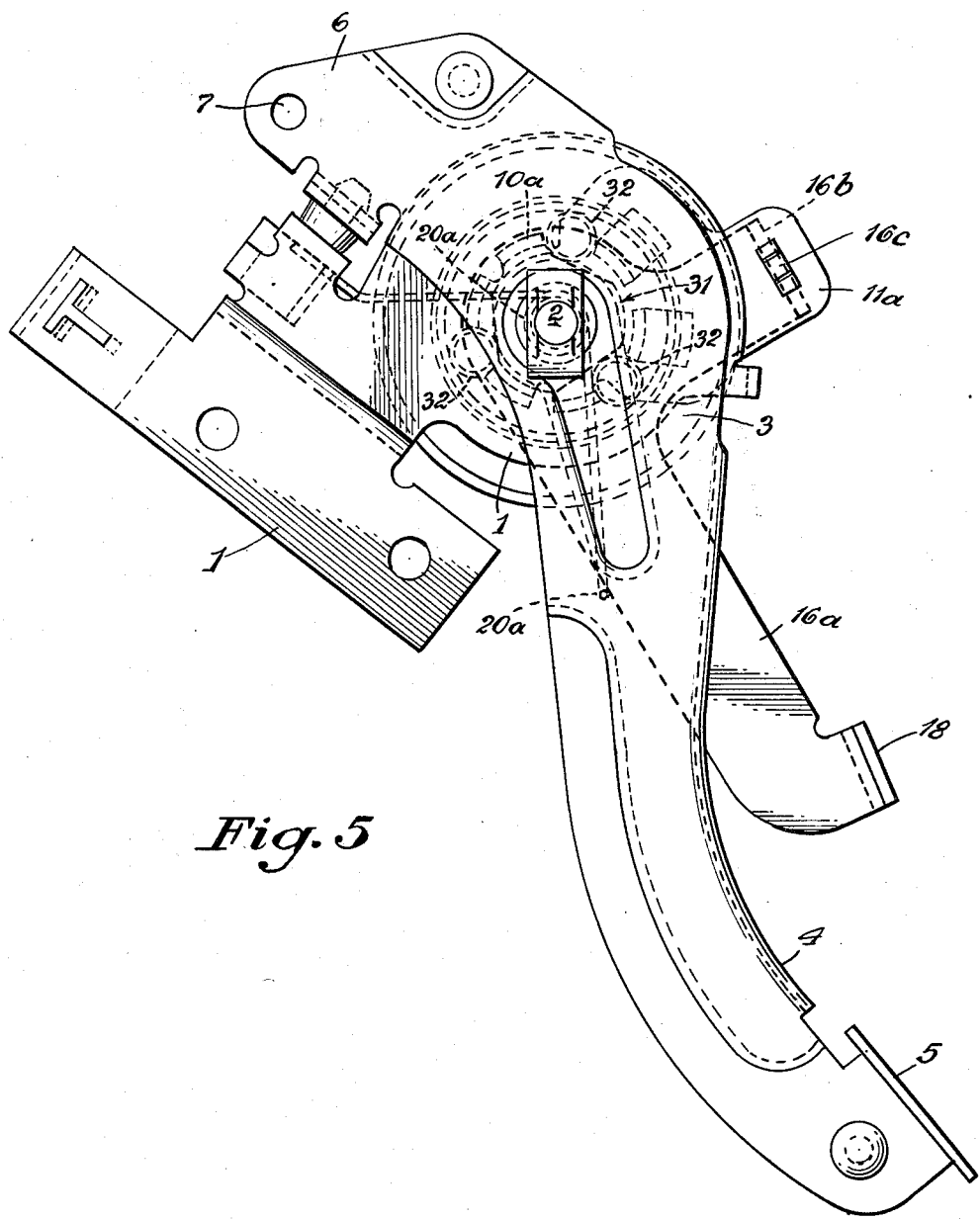
Figure 5 is a side elevation similar to that of Figure 1 and illustrating a variant form of my invention.
Figure 6:
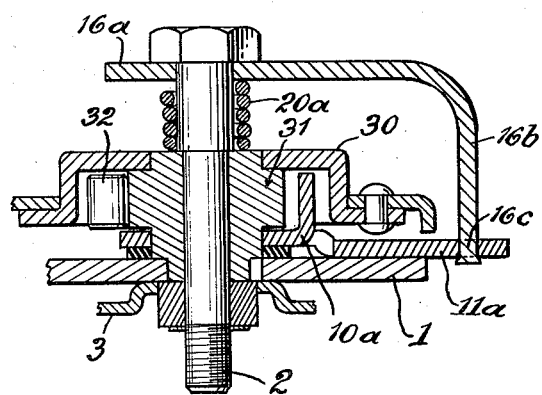
Figure 6 is a detail view in partial cross-section illustrating a portion of the device of Figure 5.

In Figures 5 and 6, I illustrated a variant form of my invention wherein parts corresponding to those illustrated in Figures 1–4 are, for convenience, given the same numerical designations. The axle 2 is somewhat elongated over that illustrated in Figure 1. The main control lever indicated at 3—7 corresponds substantially to that illustrated in Figure 1 and is mounted for rotation about the axle 2 fixed on the plate 1. An operating change control 10a has an arm portion 11a extending outwardly beyond the housing 30.

Figure 7:
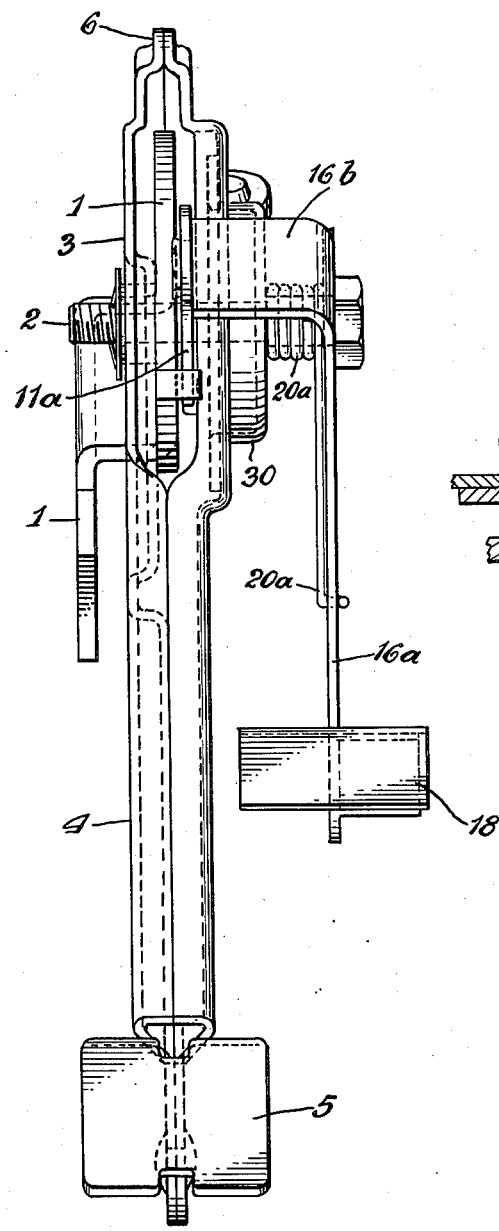
Figure 7 is an end view of the structure illustrated in Figure 5.

A foot-operable release lever 16a is mounted for rotation on and about the fixed axle 2 at a point laterally spaced from the plate 1 and housing 30, and has a laterally bent end portion 16b, the terminal end of which is operatively connected with the arm portion 11a as indicated at 16c. A spring 20a is coiled about the axle 2 between the release lever 16a and housing 30 and has its opposite ends operatively connected with the plate 1 and release lever 16a. As indicated best in Figure 7, the pedal elements at the outer extremities of the main control lever and release lever are laterally and longitudinally spaced one from the other.

The use and operation of my invention are as follows:

In order to apply the auxiliary or emergency brakes by means of the mechanism of my invention, the vehicle operator finds it necessary only to apply a smooth, continuous foot pressure against the pedal portion 5. This results in rotation of the arm 3 in clockwise direction, as the parts are shown in the drawings, about the pivot 2. In so doing, the emergency brake cable (not shown) secured within the aperture 7 is pulled and the brakes are applied. As the arm 3 is rotated, the inner wall of the housing 30 causes movement of the rollers or rounded members 32 along the cam surfaces 31a to compress the members 32 therebetween and thus to lock the control mechanism of my invention at the point desired by the operator. It will be observed that the arrangement of parts is such that the slightest movement of the arm 3 toward brake-applying direction causes a corresponding application of the brakes.

When the operator desires to release the brake of my invention, it is necessary only that the operator apply foot pressure again and in the same direction to the pedal portion 18 of the release lever 16. The said foot pressure causes rotation of the lever 16, as the parts are shown in the drawings, in a clockwise direction about the pivot 15. In response to the consequent movement of the pin 17 through the slot 12, arranged in angular relation to a line drawn between the pivot 2 and the pin 17, the arm 11 of the release member 10 is also rotated to move, through the agency of the finger portions 33 thereof, the rounded members 32 out of tight engagement with cam surface 31a and inner wall of the housing 30 or toward the center point of the cam surface 31a to release the brake lever 3. It will be understood that the emergency brake cable (not shown) secured to the portion 6 at the aperture 7 has associated therewith effective yielding elements arranged to urge the cable toward brakes-off position and that the arm 3, in response to action of said yielding elements, will be returned to its brakes-off position upon actuation of the release lever 16. The excursion of the control lever 3 toward brakes-off position is terminated upon contact of the abutment portion 41 with the resilient receiver abutment 40 secured to the plate 1.

I claim:

1. In an auxiliary brake control mechanism, a mounting plate, an axle fixed on said plate and extending laterally therefrom, a main control lever mounted for rotation on said axle, a cylindrical housing fixed on said control lever and rotatable concentrically with and about said axle, a cam fixed on said axle within said housing, a rounded member positioned between said cam and the inner wall of said housing, a release member mounted for rotation on said axle and having finger portions within said housing positioned to engage said rounded member in response to rotation of said release member, said release member having an arm portion extending beyond said housing, said axle extending through and beyond said housing and carrying adjacent its outer end a release lever mounted for rotation on said axle concentrically with said release member, said release lever having an operative connection with said release member arm portion outside said housing, said control lever and release lever extending substantially in the same direction from said axle and carrying at their outer ends foot-operable pedal portions, said pedal portions being laterally operatively spaced one from the other said release lever having an arm portion paralleling said release member arm portion in spaced relationship therewith, the outer ends of said arm portions being joined to provide said operative connection.

2. A control mechanism comprising a support, a main lever rotatably mounted on said support, locking means effective to cause locking of said lever at all positions of its travel in one direction and release means effective to cause immediate release of said lever for uninhibited return in the opposite direction, said locking means comprising a cylindrical housing fixed on said lever for rotation therewith, a cam fixed on said support and positioned entirely within said housing, said cam being concentric with said housing and having a plurality of substantially flat cam surfaces lying in intersecting planes and opposed to circumferentially spaced arcuate portions of the cylindrical wall of said housing, a rounded member positioned between each of said cam surfaces and the opposed portion of said cylindrical wall, said rounded members having a diameter less than the space between said cylindrical wall and the central portion of said cam surfaces and greater than the space between said cylindrical wall and the opposite end portions of said cam surfaces, said release means comprising a release member rotatably mounted on said support concentrically with said cam and housing and having finger portions extending into said housing and rotatable into engagement with said rounded members to move the same toward the center of said cam surface in response to rotation of said release member and means for rotating said release member, said last named means comprising an actuating lever rotatably mounted on said support concentrically with said cam and housing, said actuating lever having a foot-operable pedal portion at its outer end and having an operating engagement with said release member.

3. The structure of claim 2 characterized by and including an arm portion on said release member and extending outwardly from said housing and an arm portion on said actuating lever and wherein said operating engagement comprises a fixed connection between the outer end portions of said arm portions.

4. A control mechanism for emergency brakes and the like comprising, in combination, a support, a cam member fixed on said support and having a plurality of cam surfaces tangentally disposed in relation to the axis of said cam member, said cam surfaces being circumferentially spaced about and equidistant radially from the axis of said cam member, a brake lever pivoted on said support for rotation about and concentrically with the axis of said cam member, a housing fixed on said brake lever for rotation concentrically therewith, said housing enclosing said cam member and having a cylindrical wall surrounding said cam member, yielding means secured to said brake lever to urge said brake lever toward brakes-off position, a roller enclosed between each of said cam surfaces and an opposed portion of said cylindrical housing wall, a release lever pivotally mounted on said support for rotation about and concentrically with the axis of said cam member, said release lever having an arm portion extending radially from the axis of said cam member and beyond said cylindrical housing wall, said release lever having finger elements extending into said housing and rotatable into engagement with said rollers and means for rotating said release lever including an operating lever movably mounted on said support and having an operating engagement with said release lever arm portion, said operating lever being concentrically mounted with said cam, housing, and release lever and having an arm portion spacedly paralleling said release lever arm portion, the outer ends of said arm portions being joined to provide said operating engagement.

5. In combination, a support, a main brake lever mounted on said support for rotation about a fixed axis, a cam member fixed on said support co-axially with said brake lever, a housing fixed on said brake lever for rotation concentrically with the axis of and surrounding said cam member, rollers within and movable toward frictional engagement with said housing in response to rotation of said lever in one direction, and release means comprising a lever pivotally mounted on said support for rotation about said axes of said cam member, brake lever and housing, said release lever having a radially extending arm portion, said release lever having finger elements spaced circumferentially about its axis of rotation and extending into said housing for engagement with said rollers and an actuating lever movably mounted on said support and having an actuating engagement with said release lever arm portion, said actuating lever being mounted for rotation concentrically with said housing and said release lever having a laterally extending arm in spaced, parallel relationship with said release lever arm portion, the outer ends of said release lever and actuating lever arm portions being joined to provide said actuating engagement.

6. A control mechanism comprising a support, a main lever rotatably mounted on said support, locking means effective to cause locking of said lever at all positions of its travel in one direction and release means effective to cause immediate release of said lever for uninhibited return in the opposite direction, said locking means comprising a cylindrical housing fixed on said lever for rotation therewith, a cam fixed on said support and positioned entirely within said housing, said cam being concentric with said housing and having a plurality of substantially flat cam surfaces lying in intersecting planes and opposed to circumferentially spaced arcuate portions of the cylindrical wall of said housing, a rounded member positioned between each of said cam surfaces and the opposed portion of said cylindrical wall, said rounded members having a diameter less than the space between said cylindrical wall and the central portion of said cam surfaces and greater than the space between said cylindrical wall and the opposite end portions of said cam surfaces, said release means comprising a release member rotatably mounted on said support concentrically with said cam and housing and having finger portions extending into said housing and rotatable into engagement with said rounded members to move the same toward the center of said cam surface in response to rotation of said release member and an actuating lever having a foot-operable pedal portion at an outer end thereof, said actuating lever being rotatably mounted on said support at a point spaced from the axis of rotation of said main lever and having a lost-motion operating connection with said release member.

7. Structure of claim 6 characterized by and including a foot-operable pedal portion at one end of said main lever and wherein said main lever and said actuating lever extend in the same direction from said support and wherein said pedal portion of said main lever is spaced a greater distance from said support than said pedal portion of said actuating lever.

8. A control mechanism for emergency brakes and the like comprising, in combination, a support, a cam member fixed on said support and having a plurality of cam surfaces tangentially disposed in relation to the axis of said cam member, said cam surfaces being circumferentially spaced about and equidistant radially from the axis of said cam member, a brake lever pivoted on said support for rotation about and concentrically with the axis of said cam member, a housing fixed on said brake lever for rotation concentrically therewith, said housing enclosing said cam member and having a cylindrical wall surrounding said cam member, yielding means secured to said brake lever to urge said brake lever toward brakes-off position, a roller enclosed between each of said cam surfaces and an opposed portion of said cylindrical housing wall, a release lever pivotally mounted on said support for rotation about and concentrically with the axis of said cam member, said release lever having an arm portion extending radially from the axis of said cam member and beyond said cylindrical housing wall, said release lever having finger elements extending into said housing and rotatable into engagement with said rollers and means for rotating said release lever including an operating lever movably mounted on said support and having an operating engagement with said release lever arm portion, said brake lever and operating lever extending in the same general direction from said support, said brake lever having a foot-operable pedal portion at its outer end, said operating lever having a foot-operable pedal portion at its outer end, said brake lever and operating lever being movable in the same direction with respect to said support to apply and release said brakes respectively.

References Cited in the file of this patent
UNITED STATES PATENTS

| | | |
|---|---|---|
| 830,146 | Hamilton et al. | Sept. 4, 1906 |
| 837,043 | Discher | Nov. 27, 1906 |
| 1,156,586 | Cooper | Oct. 12, 1915 |
| 1,840,960 | Krueger | Jan. 12, 1932 |
| 2,066,167 | Swartz | Dec. 29, 1936 |

UNITED STATES PATENT OFFICE
CERTIFICATE OF CORRECTION

Patent No. 2,935,895                                                      May 10, 1960

Herbert Krause

It is hereby certified that error appears in the above numbered patent requiring correction and that the said Letters Patent should read as corrected below.

In the drawings, Fig. 3 erroneously shows release element 10 as attached to housing 30 whereas it is, in fact, integral with finger portions 33.

Signed and sealed this 26th day of June 1962.

(SEAL)
Attest:

ERNEST W. SWIDER                                        DAVID L. LADD
Attesting Officer                                           Commissioner of Patents